United States Patent [19]

Ikebuchi

[11] Patent Number: 5,528,929
[45] Date of Patent: Jun. 25, 1996

[54] MISFIRE DETECTING APPARATUS FOR INTERNAL COMBUSTION ENGINE WITH MANUFACTURING ERROR COMPENSATION

[75] Inventor: Kazuhiro Ikebuchi, Himeji, Japan

[73] Assignee: Mitsubishi Denki Kabushiki Kaisha, Tokyo, Japan

[21] Appl. No.: 405,951

[22] Filed: Mar. 17, 1995

[30] Foreign Application Priority Data

Mar. 18, 1994 [JP] Japan .................................. 6-048908

[51] Int. Cl.$^6$ ................................................ F02P 01/00
[52] U.S. Cl. ...................... 73/116; 73/117.3; 364/431.07
[58] Field of Search ................................... 73/116, 117.2, 73/117.3; 364/431.07, 431.08

[56] References Cited

U.S. PATENT DOCUMENTS

| | | | |
|---|---|---|---|
| 4,081,995 | 4/1978 | Griffith et al. | 73/117.3 |
| 4,158,305 | 6/1979 | Shipley | 73/117.3 |
| 4,337,647 | 7/1982 | Radcliffe et al. | 73/116 |
| 4,438,497 | 3/1984 | Willis et al. | 73/117.3 |
| 5,040,412 | 8/1991 | Wannenwetsch | 73/116 |
| 5,197,325 | 3/1993 | Tamura et al. | 73/117.3 |
| 5,297,047 | 3/1994 | Matsuno | 73/117.3 |
| 5,307,670 | 5/1994 | Imai et al. | 73/117.3 |
| 5,345,817 | 9/1994 | Grenn et al. | 73/117.3 |
| 5,426,587 | 6/1995 | Imai et al. | 73/117.3 |

FOREIGN PATENT DOCUMENTS 4194346  7/1992  Japan .

Primary Examiner—Richard Chilcot
Assistant Examiner—George M. Dombroske
Attorney, Agent, or Firm—Sughrue, Mion, Zinn, Macpeak & Seas

[57] ABSTRACT

A misfire detecting apparatus for an internal combustion engine includes an angular position sensor 2,3 mounted on a crank shaft of the engine and composed of segments 12,13 defining angular intervals corresponding to reference positions for a plurality of cylinders of the engine, a period measuring circuit 6 for measuring periods of pulse signals SGT from the sensor, a correcting coefficient arithmetic circuit 7 for determining a plurality of correcting coefficients KL1,KL2 on the basis of the plurality of periods in a steady operation state of the engine, a period variation index arithmetic circuit 8 for arithmetically determining an index which quantifies variation of the period on the basis of the correcting coefficients and the periods, and a misfire decision circuit 9 for making decision as to occurrence of misfire in the engine on the basis of the period variation index. The correcting coefficient arithmetic circuit includes learning/updating arithmetic circuitry for updating the correcting coefficients the same number of times to respective latest values by learning.

10 Claims, 9 Drawing Sheets

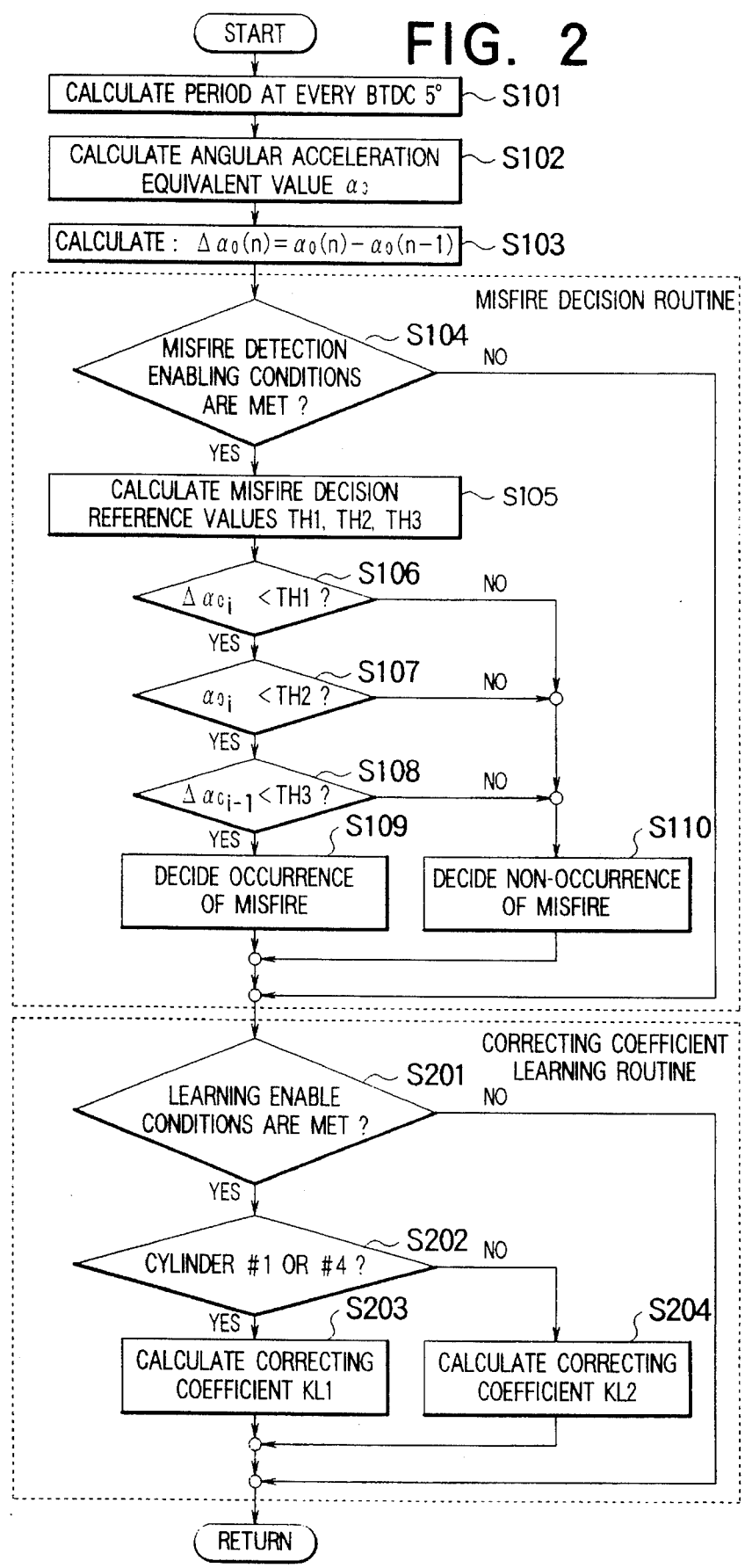

ENGINE SPEED (rpm)

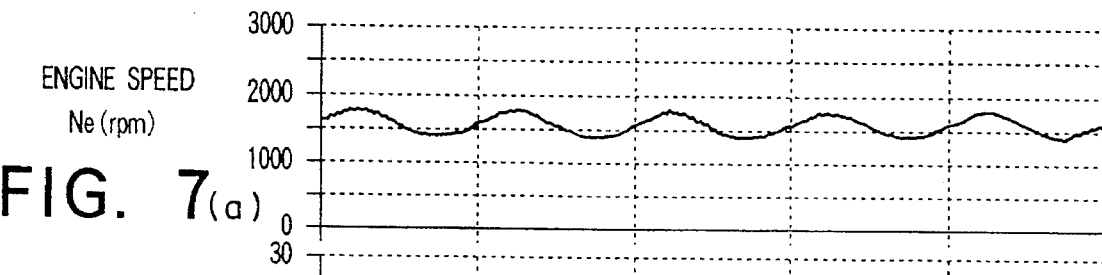
FIG. 7(a)
FIG. 7(b)
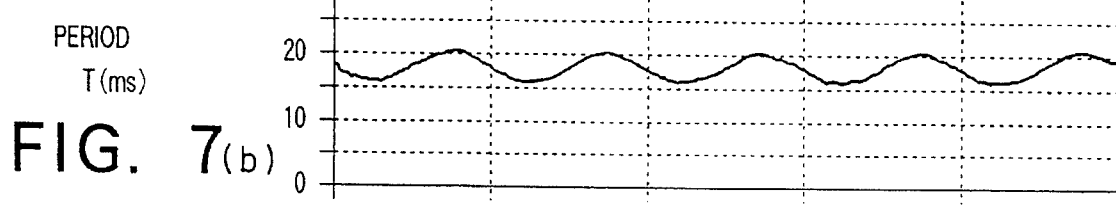
FIG. 7(c)
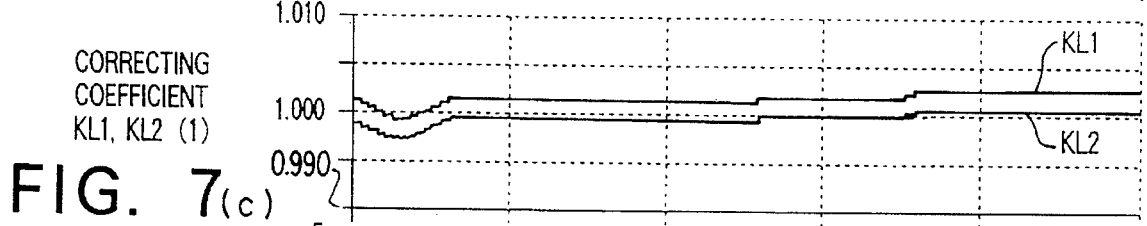
FIG. 7(d)
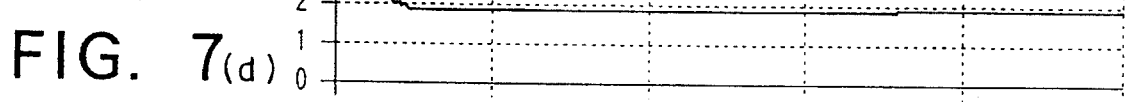
FIG. 7(e)
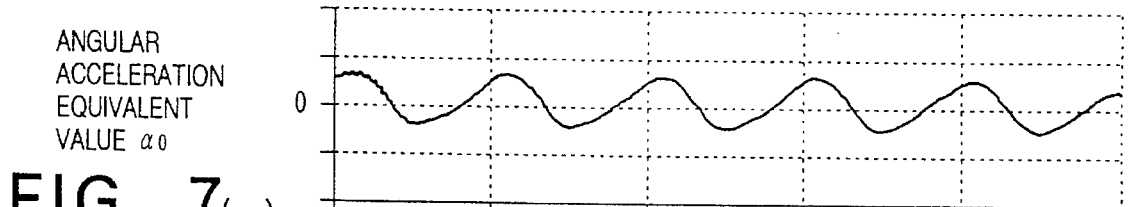
FIG. 7(f)
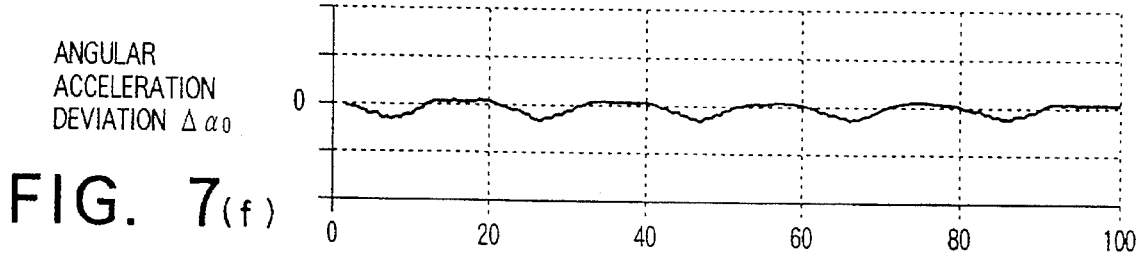
ENGINE SPEED (rpm)

5,528,929

1

MISFIRE DETECTING APPARATUS FOR INTERNAL COMBUSTION ENGINE WITH MANUFACTURING ERROR COMPENSATION

BACKGROUND OF THE INVENTION

1. Field of the Invention

The present invention relates generally to an apparatus for detecting occurrence of a misfire event in an internal combustion engine on the basis of an angular position signal which is obtained from a sensing blade assembly rotating together with a crank shaft through the medium of a crank angle sensor. More particularly, the invention is concerned with a misfire detecting apparatus for an internal combustion engine (hereinafter also referred to as the engine for short) which is capable of determining occurrence of misfire with high accuracy without being affected by error components contained in the angular position signal.

2. Description of Related Art

As the hitherto known misfire detecting apparatus for the internal combustion engine, there may be mentioned, for example, a technique disclosed in Japanese Unexamined Patent Application Publication No. 194346/1992 (JP-A-4-194346), according to which a period of a pulse signal generated at every unit crank angle is measured, wherein an index indicating variation of the period as determined on the basis of the period of the pulse signal (i.e., a value determined by differentiating three times a mean angular acceleration per unit crank angle) is compared with a predetermined reference value for deciding definitely occurrence of misfire in the engine. This known technique will be reviewed below in more detail for having better understanding of the background techniques of the present invention.

FIG. 8 is a schematic diagram showing a structure of the misfire detecting apparatus described above and incorporated in a control system for an internal combustion engine. Referring to the figure, an internal combustion engine 1 includes a plurality of cylinders (only one of which is shown representatively). A sensing blade assembly 2 (constituting part of reference angular position setting means) is mounted on a crank shaft of the engine 1. A crank angle sensor 3 detects the edges of segments of the sensing blade assembly 2 and outputs an angular position signal indicative of a corresponding reference angular position of the crank shaft.

A misfire detecting means 4 is designed to detect variation in the rotation of the engine 1 on the basis of the angular position signal SGT generated by the crank angle sensor 3 to thereby make decision as to occurrence of misfire. To this end, the misfire detecting means 4 is equipped with an input terminal 21 for fetching the angular position signal SGT, an output terminal 22 for outputting an abnormality signal E when occurrence of misfire is decided, an input terminal 23 for fetching a cylinder identifying signal SGC from a sensor means (not shown) mounted on a cam shaft of the engine 1, and an input terminal 24 for fetching a signal indicative of engine operation state D from a variety of sensors (not shown). A display unit 5 responds to the abnormality signal E for alarming a driver of occurrence of misfire when the misfire detecting means 4 detects the misfire at a ratio greater than a predetermined value.

FIG. 9 is a timing chart for illustrating the general operation of the conventional misfire detecting apparatus shown in FIG. 8 on the assumption that the misfire takes place only once in the course of normal combustion cycles.

2

In FIG. 9, a reference symbol $\omega$ represents an actual angular speed of the engine 1, and $\alpha$ represents an angular acceleration which is arithmetically determined or calculated on the basis of a period or duration T between falling edges of the angular position signals SGT delivered from the crank angle sensor 3. Further, a reference symbol $\Delta\alpha$ represents an angular acceleration deviation or difference between the preceding calculation value $\alpha_{i-1}$ of the angular acceleration $\alpha$ and the current calculation value $\alpha_i$, a symbol $\Delta\beta$ represents a secondary deviation or difference between the preceding calculation value $\Delta\alpha_{i-1}$ of the angular acceleration deviation $\Delta\alpha$ and the current calculation value $\Delta\alpha_i$ thereof, and a symbol $\Delta\gamma$ represents a tertiary deviation or difference between the preceding calculation value $\Delta\beta_{i-1}$ of the secondary deviation $\Delta\beta$ and the current calculation value $\Delta\beta_i$ thereof.

As shown in FIG. 9, there are determined decision reference values $C_i$, $C_{i-1}$ and $C_{i-2}$ (see broken lines) for the current value $\Delta\gamma_i$, the preceding value $\Delta\gamma_{i-1}$ and the prepreceding preceding value $\Delta\gamma_{i-2}$ of the tertiary deviation $\Delta\gamma$, respectively. The misfire detecting means 4 is designed to compare the values $\Delta\gamma_i$, $\Delta\gamma_{i-1}$ and $\Delta\gamma_{i-2}$ with the reference values $C_i$, $C_{i-1}$, and $C_{i-2}$, respectively, to thereby decide occurrence of misfire when the conditions mentioned below are simultaneously satisfied:

$\Delta\gamma_i > C_i$ $\Delta\gamma_{i-1} > C_{i-1}$ $\Delta\gamma_{i-2} > C_{i-2}$ Next, referring to FIGS. 10 and 11, description will be made of error involved in the misfire decision processing executed by the conventional misfire detecting apparatus shown in FIGS. 8 and 9.

In general, the crank angle indicated by the edge of the segment of the sensing blade assembly 2 contains some error because of unavoidable manufacturing tolerance (i.e., limitation imposed on the precision with which the sensing blade assembly 2 is to be manufactured).

FIG. 10 is an enlarged side elevational view showing schematically a structure of the sensing blade assembly 2. Referring to the figure, the sensing blade assembly 2 is comprised of a center portion or cylindrical body 11 and segments 12 and 13 formed of a same material with the cylindrical body 11 in an integrated structure. The sensing blade assembly 2 is mounted on the crank shaft 14 of the engine 1.

In the sensing blade assembly, the one segment 12 serves to determine the timings of the angular position signals SGT corresponding to the angular position located before the top dead center by 75° (hereinafter represented by BTDC 75°) and the angle position before the top dead center by 5° (hereinafter represented by BTDC 5°) for each of the first and fourth cylinders #1 and #4, respectively, while the other segment 13 serves to determine the timings of the angular position signals SGT corresponding to BTDC 75° and BTDC 5° for the second and third cylinders, respectively.

The angular position signal SGT generated by the crank angle sensor 3 contains unavoidable error components due to a number of causes or factors. By way of example, there may mentioned as these factors an inter-edge angle error $\epsilon 1$ in the angular extensions or spans of the segments 12 and 13 which is involved in manufacturing the sensing blade assembly 2 as a unitary structure and an eccentricity error $\alpha 2$ in the center of rotation of the cylindrical body 11 as involved in mounting the sensing blade assembly 2 on the crank shaft 14. Thus, the angular position signal SGT contains error components affected significantly by these error factors $\epsilon 1$ and $\epsilon 2$.

FIG. 11 is a timing chart for illustrating variations in the quantities $\alpha, \Delta\alpha, \Delta\beta$ and $\Delta\gamma$ as determined by simulation on the assumption that the inter-edge angle error contained in the angular position signal SGT due to the eccentricity error $\epsilon 2$ is 0.4°. As can be seen from FIG. 11, when the misfire detection processing is executed by using the tertiary deviation $\Delta\gamma$ in accordance with the decision condition mentioned previously, there arises a situation in which the misfire decision conditions are not satisfied for a misfire event because the tertiary deviation contains detection error of 0.4°. More specifically, because $\Delta\gamma_i > C_i$, $\Delta\gamma_{i-1} < C_{i-1}$, and $\Delta\gamma_{i-2} > C_{i-2}$ in this case, the aforementioned conditions for deciding occurrence of misfire are not met. In this manner, the conventional misfire detecting apparatus suffers a problem that the occurrence of misfire can not be detected with reliability because of incapability of performing the misfire decision processing with accuracy. Of course, in the conventional misfire detecting apparatus, there may arise such a situation in which occurrence of misfire is erroneously detected even when variation in the engine speed (rpm) due to the misfire event does not take place in actuality.

As is apparent from the above, in the misfire detecting apparatus of the engine known heretofore, decision as to occurrence of misfire is realized by comparing the pre-preceding value $\Delta\gamma_{i-2}$, the preceding value $\Delta\gamma_{i-1}$ and the current value $\Delta\gamma_i$ of the tertiary deviation $\gamma\gamma$ of the mean angular acceleration $\alpha$ with the decision reference values $C_{i-2}$, $C_{i-1}$, $C_i$, respectively. Accordingly, when the value of $\Delta\gamma$ suffers error contained in the angular position signal SGT, the misfire detecting apparatus known heretofore can not detect the occurrence of misfire with reliability.

SUMMARY OF THE INVENTION

In the light of the state of the art described above, it is an object of the present invention to provide a misfire detecting apparatus for an internal combustion engine which is capable of making misfire decision with high accuracy and reliability without being influenced by error contained in the angular position signal generated by a sensor disposed in opposition to a sensing blade assembly.

In view of the above and other objects which will become apparent as the description proceeds, there is provided according to a first aspect of the present invention a misfire detecting apparatus for an internal combustion engine, which apparatus includes a sensing blade assembly mounted on a crank shaft of the internal combustion engine and including segments defining angular intervals corresponding to reference positions for a plurality of cylinders of the engine, respectively, a crank angle sensor disposed in opposition to the sensing blade assembly for generating a plurality of pulse signals as an angular position signal for every predetermined crank angle per one rotation of the crank shaft, a period measuring means for measuring periods of the plurality of pulse signals, a correcting coefficient arithmetic means for determining a plurality of correcting coefficients on the basis of the plurality of periods in a steady operation state of the internal combustion engine, a period variation index arithmetic means for arithmetically determining an index which quantifies variation of the period on the basis of the correcting coefficients and a misfire decision means for making decision as to occurrence of misfire in the internal combustion engine on the basis of the period variation indexes, wherein the correcting coefficient arithmetic means includes an updating arithmetic means for updating the plurality of correcting coefficients to respective updated values by learning, and wherein the updating arithmetic means updates the plurality of correcting coefficients such that numbers of times for updating the correcting coefficients are substantially same for the plurality of correcting coefficients, respectively.

With the structure of the misfire detecting apparatus described above, the so-called one-sided learning of particular one (or ones) of the correcting coefficients can be prevented, whereby decision as to occurrence of misfire can be made with high accuracy and reliability without being affected by error components contained in the angular position signal which are primarily due to manufacturing tolerances of the sensing blade assembly.

In a preferred mode for carrying out the invention, the plurality of correcting coefficients may be selected so as to correspond to the angular intervals of the segments of the sensing blade assembly, respectively.

By virtue of the arrangement described above, reliability of the correcting coefficients can be enhanced, which in turn contributes to realization of the misfire detecting apparatus which can ensure high accuracy and reliability.

In another preferred mode for carrying out the invention, the plurality of correcting coefficients may be arithmetically determined on the basis of the ratios between a period corresponding to the one rotation of the crank shaft and periods corresponding to the angular intervals, respectively.

With the arrangement described above, the misfire detecting capability of the apparatus can positively be protected against adverse influence of variation of the period, whereby reliability of the correcting coefficients can be enhanced, which in turn contributes to realization of the misfire detecting apparatus which can enjoy high accuracy and reliability.

In yet another preferred mode for carrying out the invention, the plurality of correcting coefficients may be determined in correspondence to cylinders of the engine, respectively.

With the arrangement described above, the misfire detecting capability of the apparatus can positively be protected against influence of variation of the period, whereby reliability of the correcting coefficients can be enhanced, which in turn contributes to realization of the misfire detecting apparatus enjoying high accuracy and reliability.

In still another preferred mode for carrying out the invention, the plurality of correcting coefficients may be arithmetically determined on the basis of the ratios between a period corresponding to the two rotations of the crank shaft and periods corresponding to the angular intervals, respectively.

By determining the correcting coefficients in the manner mentioned above, the influence of variation of the period can further be reduced.

In a further preferred mode for carrying out the invention, the updating arithmetic means may update simultaneously the plurality of correcting coefficients.

By updating simultaneously all the correcting coefficients, the numbers of times for updating the coefficients can be made identical for all the coefficients, whereby the reliability of the misfire detecting apparatus can further be enhanced.

In a yet further preferred mode for carrying out the invention, when the conditions for allowing the correcting coefficients to be updated are satisfied only intermittently, updating of the correcting coefficients which succeeds to the last updating of the correcting coefficient corresponding to the angular interval for the cylinder from which the updating of the correcting coefficients has been started is invalidated.

In a still further preferred mode for carrying out the invention, when conditions for allowing the correcting coefficients to be updated are satisfied intermittently, updating of the correcting coefficients which succeeds to the last updating of the correcting coefficient corresponding to the cylinder from which the updating of the correcting coefficients has been started is disenabled.

With the arrangements of the misfire detecting apparatus described above, the non-uniform repetition of updating the correcting coefficients on a one-by-one basis can be avoided, whereby reliability of the correcting coefficients as well as accuracy of the misfire detection can be ensured even when the correcting coefficients are corrected intermittently.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 2 is a flow chart for illustrating generally a procedure for learning/updating correcting coefficients in the first embodiment;

FIGS. 7(a)–7(f) are timing charts for illustrating operation of the apparatus according to the first embodiment as performed in accordance with the procedure shown in FIG. 6;

DESCRIPTION OF THE PREFERRED EMBODIMENTS

Now, the present invention will be described in detail in conjunction with what is presently considered as preferred or typical embodiments thereof by reference to the drawings.

Embodiment 1

Figure 1:
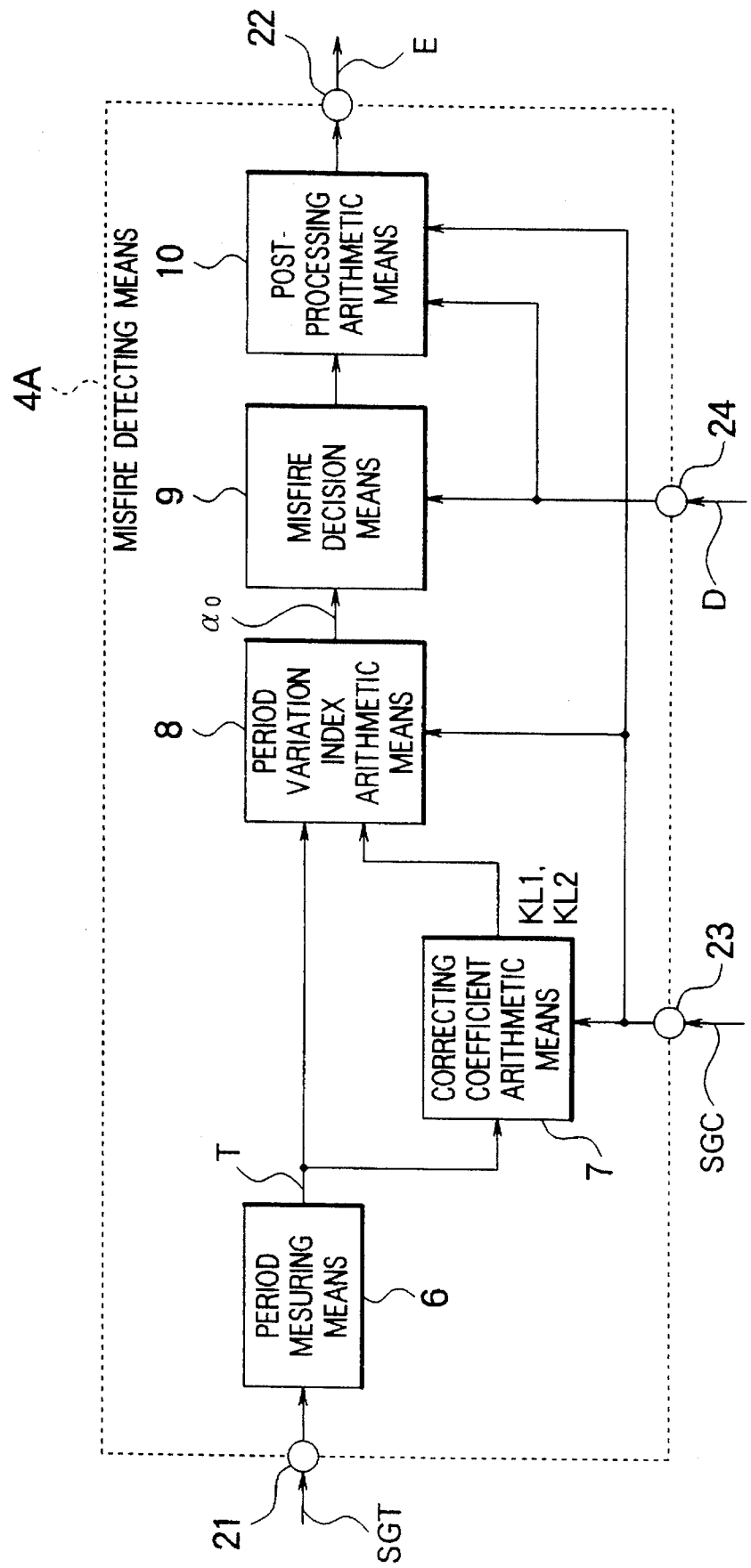
FIG. 1 is a functional block diagram showing an arrangement of a misfire detecting means and peripheral devices therefore according to a first embodiment of the invention.

Description will now be made of a misfire detecting apparatus according to a first embodiment of the present invention. FIG. 1 is a functional block diagram showing a structure of a misfire detecting means according to the first embodiment of the invention. In the figure, reference numerals 3, 5 and 21 to 24 denote like parts as those denoted by same reference numerals used hereinbefore in the description of the related art. Further, a misfire detecting means denoted by a reference character 4A corresponds to the misfire detecting means 4 known heretofore. Further, the structure of the misfire detecting apparatus as a whole is substantially same as that shown in FIG. 8.

Figure 10:
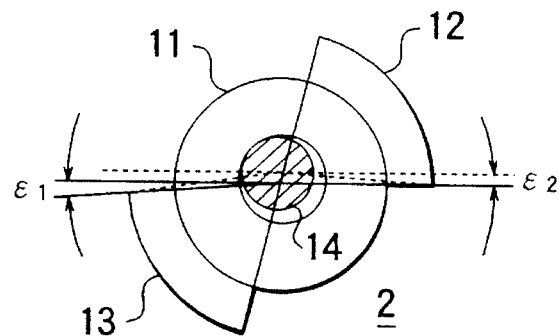
FIG. 10 is an enlarged side elevational view showing schematically a structure of a sensing blade assembly for detecting crank angular positions.
Figure 11:
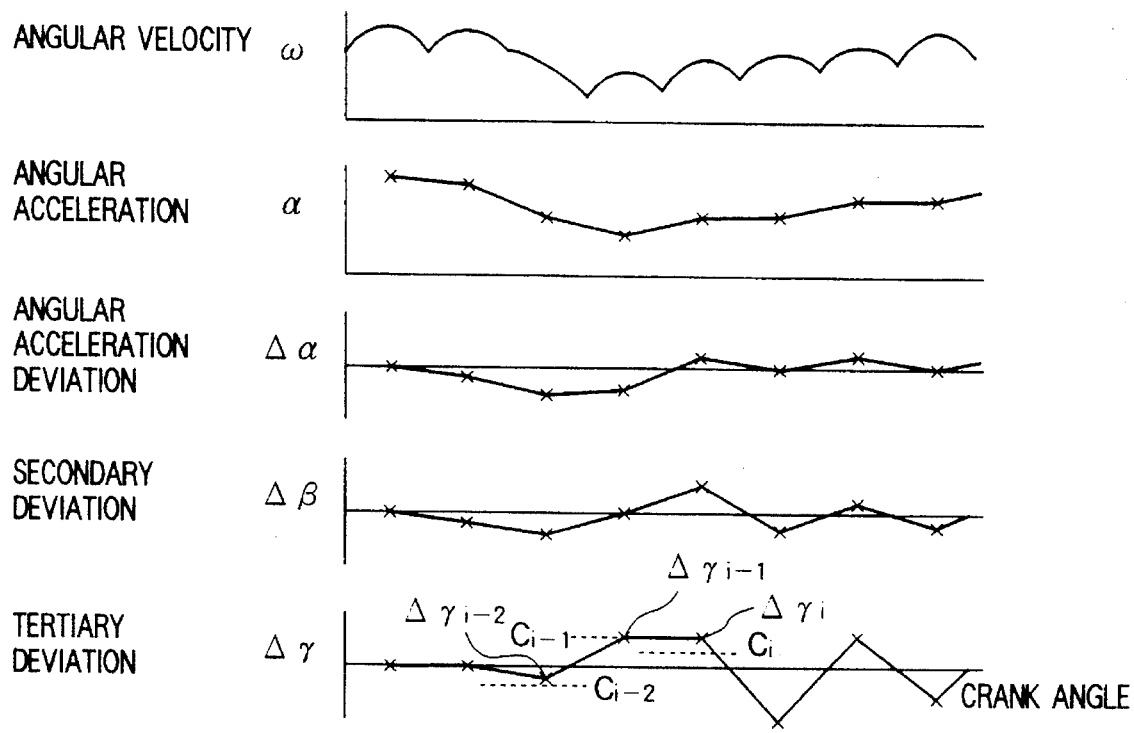
FIG. 11 is a timing chart for illustrating errors involved in misfire decision due to error in detecting the angular position of the crank shaft of the engine in the apparatus known heretofore.

In the misfire detecting means 4A according to the instant embodiment of the invention, correcting coefficients are used to compensate for the error involved in the detection of angular positions of the crank shaft in response to the segments 12 and 13 of the sensing blade assembly 2 (see FIG. 10).

Now, referring to FIG. 1, a period measuring means 6 is designed for measuring the inter-edge period T which represents a predetermined angular distance for rotation of the crank shaft of the engine 1 which is determined by edge positions of the segments 12 and 13 of the sensing blade assembly 2 on the basis of the pulse signal contained in the angular position signal SGT. Provided in association with the period measuring means 6 is a correcting coefficient arithmetic means 7 for arithmetically determining or calculating correcting coefficients KL1 and KL2 for correcting or canceling out the error involved in the inter-edge period T due to inter-edge angle error $\epsilon 1$ in the angle between the segments 12 and 13 of the sensing blade assembly 2. The correcting coefficient arithmetic means 7 incorporates therein an updating arithmetic means for updating the correcting coefficients KL1 and KL2 to the latest or newest values by learning the plurality of correcting coefficients KL1 and KL2. In this conjunction, the updating arithmetic means is so designed that a number of times for updating the value of the correcting coefficient is substantially the same for all of the correcting coefficients KL1 and KL2.

Further provided is a period variation index arithmetic means 8 for determining arithmetically or calculating an angular acceleration equivalent value $\alpha o$ on the basis of the cylinder identifying signal SGC, the inter-edge period T and the correcting coefficients KL1 and KL2, wherein the angular acceleration equivalent value $\alpha o$ is utilized as the period variation index for quantifying variation of the period T.

Additionally, the misfire detecting means 4A includes a misfire decision means 9 for deciding definitely the occurrence of misfire on the basis of the angular acceleration equivalent value $\alpha o$ and misfire decision reference values TH1 and TH2 which in turn are determined on the basis of the operating state information D including information concerning the engine speed Ne (rpm), engine load and others.

Further incorporated in the misfire detecting means 4A is a postprocessing arithmetic means 10 for generating an abnormality signal E upon detection of occurrence of misfire. To this end, the postprocessing arithmetic means 10 is so implemented as to count misfire identification signals outputted from the misfire decision means 9 to thereby store information indicating occurrence of a fault in the engine and at the same time outputs the abnormality signal E for triggering operation of the display device 5 for generating an alarm by taking into account the cylinder identifying signal SGC and the operating states D of the engine 1, when the number of misfire events as counted exceeds a predetermined misfire event ratio.

Figure 8:
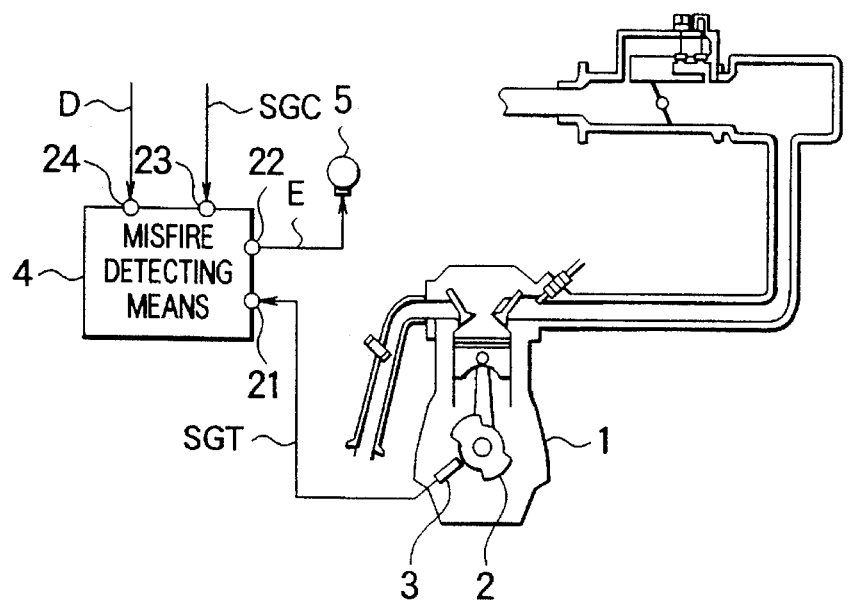
FIG. 8 is a schematic diagram showing a misfire detecting apparatus of an internal combustion engine known heretofore.
Figure 9:
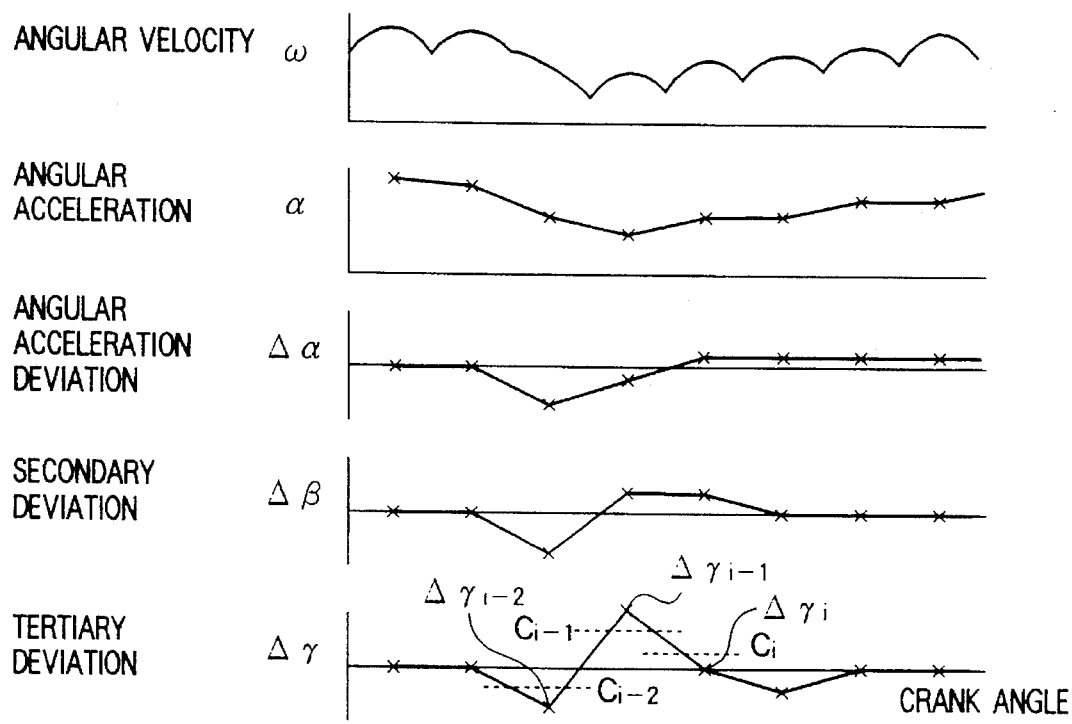
FIG. 9 is a timing chart for illustrating operation of the conventional misfire detecting apparatus shown in FIG. 8.

Next, by referring to a flow chart of FIG. 2 in combination with FIGS. 8 and FIG. 10, description will be made in detail of operation of the misfire detecting apparatus shown in FIG. 1.

In a step S101, the period measuring means 6 measures the inter-edge period T between the falling edges making appearance at every BTDC 5° in the angular position signal SGT outputted from a crank angle sensor 3. Subsequently, in a step S102, the period variation index arithmetic means 8 calculates the angular acceleration equivalent value αo on the basis of the inter-edge period T and the correcting coefficients KL1 and KL2 delivered from the correcting coefficient arithmetic means 7. More specifically, immediately after the angular position BTDC 5°, the period variation index arithmetic means 8 calculates the angular acceleration equivalent value αo for the first and fourth cylinders in accordance with the following expression (1):

$$\alpha o = (1/T_i) \times \{(KL1_{i-1}/T_i) - (KL2_{i-1}/T_{i-1})\} \quad (1)$$

On the other hand, for the second and third cylinders, the period variation index arithmetic means 8 determines immediately after the angular position BTDC 5° the angular acceleration equivalent value so in accordance with:

$$\alpha o = (1/T_i) \times \{(KL2_{i-1}/T_i) - (KL_{i-1}/T_{i-1})\} \quad (2)$$

In the above expressions (1) and (2), the suffix "i" represents the current time point for calculating the period T with "i−1" representing the preceding calculation timing. Further, in the expressions (1) and (2), KL1 and KL2 represent correcting coefficients for correcting or canceling out error involved in the period T due to the inter-edge angle error ε1 between the segments 12 and 13. The method of determining the correcting coefficients KL1 and KL2 will be described later on.

Here, physical meanings of the expressions (1) and (2) will be elucidated.

In general, an angular velocity ω and an angular acceleration α in a circular motion can be expressed in terms of the period T as follows:

$$\omega_i = \pi/T_i \quad (3)$$

$$\alpha_i = (1/T_i) \times (\omega_i - \omega_i) \quad (4)$$

In the expression (3), the period $T_i$ provides a cause for error unless it corresponds accurately to π radians (180°). In reality, however, the period $T_i$ does not correspond precisely to π radians because of presence of the inter-edge angle error ε1 between the segments 12 and 13. Thus, correction of the period $T_i$ is necessary. Such being the circumstance, an angle correcting coefficient $K_i$ is defined as a ratio of an angle θ between the segments 12 and 13 containing a detection error to π (i.e., $K_i = \theta/\pi$) and placed in the expressions (3) and (4), which can thus be rewritten as follows:

$$\alpha_i = (\pi/T_i) \times \{(K_i/T_i) - (K_i - 1/T_i - 1)\} \quad (5)$$

In this conjunction, it will be seen from FIG. 10 that there exist two inter-edge angular intervals for BTDC 5° in correspondence to the segments 12 and 13, respectively, (i.e., in correspondence to the first and fourth cylinders and the second and third cylinders, respectively). Thus, there are prepared a pair of correcting coefficients KL1 and KL2, whereon the above expression (5) is rewritten to the expressions (1) and (2) mentioned hereinbefore, in which multiplication by a constant π is omitted.

Next, in a step S103, the misfire decision means 9 determines the angular acceleration deviation Δαo between the current value $αo_i$ and the preceding value $αo_{i-1}$ of the angular acceleration equivalent value αo in accordance with the following expression (6):

$$\Delta\alpha o_i = \alpha_i - \alpha_{i-1} \quad (6)$$

Subsequently, the misfire decision means 9 executes a misfire occurrence decision routine including steps S104 to S110.

At first, in the step S104, the misfire decision means 9 makes decision on the basis of the engine operation state information D such as the engine speed Ne, engine load, etc., as to whether the current operation states D of the engine 1 satisfy the predetermined conditions for enabling the misfire occurrence decision (i.e., steady operation state such as represented by a constant speed and/or a constant acceleration).

When the decision in the step S104 results in affirmation (YES), indicating that the conditions for enabling the misfire detection are satisfied, misfire detecting procedure (steps S105 to S110) described below is executed. On the other hand, when the answer of the decision step S104 is negative (NO), the processing proceeds to a correcting coefficient learning routine described later on without executing the steps S105 to S110.

In the step S105, the misfire decision reference values TH1, TH2 and TH3 (i.e., reference values for comparison with the current angular acceleration deviation $\Delta\alpha o_i$, the current angular acceleration deviation equivalent value $\alpha o_i$, and the preceding angular acceleration deviation $\Delta\alpha o_{i-1}$) which are proper to the current engine operation states D are arithmetically determined on the basis of predetermined typical or representative values. In succession, in the steps S106 to S108, probability of misfire occurrence is decided on the basis of the misfire decision reference values TH1, TH2 and TH3.

More specifically, in the step S106, it is decided whether or not the current angular acceleration deviation $\Delta\alpha o_{i-1}$ is greater than the misfire decision reference value TH1, while in the step S107, decision is made whether or not the current angular acceleration equivalent value $\alpha o_i$ is greater than the misfire decision reference value TH2. Further, in the step S108, it is decided whether or not the current angular acceleration deviation $\Delta\alpha o_i$ is greater than the misfire decision reference value TH3.

When all the decision steps S106, S107 and S108 result in affirmation (YES), the processing proceeds to a step S109 where it is determined that the misfire event has occurred.

On the contrary, when any one of the steps S106, S107 and S108 mentioned above results in negation (NO), indicating that the conditions for validating or enabling the decision of occurrence of misfire are not satisfied, the processing proceeds to a step S110 where it is determined that the misfire event does not take place.

The updating arithmetic means incorporated in the correcting coefficient arithmetic means 7 executes the correcting coefficient learning logics or routine for determining the correcting coefficients KL1 and KL2 by learning in the steps S201 to S204.

At first, in the S201, it is decided on the basis of the engine operation state information D such as the rotational speed Ne of the engine 1, the engine load and others whether or not the current engine state D satisfies the predetermined conditions which allow the correcting coefficient learning/updating process to be executed (e.g. whether or not the engine is in the steady operation state mentioned above).

When the answer of the step S201 is affirmative (YES), the learning logics or routine including the steps S202 to S204 mentioned below is executed. By contrast, when it is decided that the learning enable conditions mentioned above are not satisfied, the steps S202 to S204 are not executed but return is made to the start of the processing.

At this juncture, it should be mentioned that the learning enable conditions in the step S201 for allowing the learning procedure to be executed by the updating arithmetic means include a part of the conditions for enabling the misfire occurrence decision in the step S104. Consequently, the correcting coefficients learning routine is inhibited from execution when there exists likelihood of misfire occurrence. Stated in another way, the predetermined operation state conditions for validating the learning procedure are more restrictive than the steady operation state mentioned previously.

It should further be noted that although the description has been made that the correcting coefficient calculating process includes the steps S203 and S204, it includes in actuality a step for making the number of times for updating the correcting coefficients KL1 and KL2 be equal to each other.

Upon execution of the correcting coefficient learning/updating routine, it is first decided in the step S202 whether the first and fourth cylinders (cylinder #1 and #4) are of concern. When the step S202 results in negation (NO), it is then decided that the cylinder of concern is the second or third cylinder (i.e., the cylinder #2 or #3). In other words, it is decided in the step S202 which of the segments 12 and 13 of the sensing blade assembly 2 the current inter-edge period $T_i$ corresponds to. In dependence on the result of this decision, it is determined which of the correcting coefficient KL1 or KL2 is to be updated currently.

Thus, when the result of the decision step S202 is "YES", indicating that the cylinder of concern is #1 or #4, the processing proceeds to the step S203 and the correcting coefficient KL1 is arithmetically updated. On the other hand, when the step S202 results in negation "NO", this means that the cylinder of concern is associated with the segment 13 and thus the cylinder #2 or #3. Accordingly, the processing proceeds to a step S204 where the correcting coefficient KL2 is arithmetically updated.

In this way, the correcting coefficients KL1 and KL2 are alternately updated upon every falling edge of the crank angle pulse signal.

The correcting coefficients KL1 and KL2 are calculated in the step S203 in accordance with the undermentioned expressions (7) and (8), respectively. More specifically, the current correcting coefficient $KL1_i$ is arithmetically updated in accordance with the following expression (7):

$$KL1_i = Ks \times KL1_{i-1} + (1-Ks) \times KR_i \qquad (7)$$

where Ks represents a predetermined filter constant smaller than "1" inclusive (i.e., $Ks \leq 1$). In the following description, it is assumed that the value of the filter constant Ks is equal to 0.95. Further, in the expression (7), a term $KR_i$ represents a standardized value of the ratio between the period of one complete rotation of the engine 1 determined on the basis of the inter-edge period T which in turn is determined from the latest two revolutions and a period for the latest half rotation.

In the step S203, the other correcting coefficient KL2 is not updated. Stated in another way, the current correcting coefficient $KL2_i$ is equal to the preceding value. Namely, $KL2_i = KL2_{i-1}$.

On the other hand, in the step S204, the current correcting coefficient $KL2_i$ is updated in accordance with the following expression (8) which is similar to the expression (7):

$$KL2_i = Ks \times KL2_{i-1} + (1-Ks) \times KR_i \qquad (8)$$

In this case, the other correcting coefficient KL1 is not updated. Thus, $KL1_i = KL1_{i-1}$.

Parenthetically, the term $KR_i$ appearing in the expressions (7) and (8) represents a period ratio "2 ×(half period/one complete rotation period)", which is mathematically given as follows:

$$KR_i = 2 \times T_i / (T_i \times T_{i-1}) \qquad (9)$$

From the expression (9), it follows that $KR_i \leq 1$. Further, it can be seen that the period ratio $KR_1$ represents a value obtained by dividing the current period $T_i$ by a mean value $\{(T_i + T_{i-1})/2\}$ of the current and preceding periods $T_i$ and $T_{i-1}$.

Further, the correcting coefficients KL1 and KL2 represent the values derived by sampling the corresponding period ratios KR, respectively, and filtering them through a linear filter processing. In the expression (1), the correcting coefficients KL1 and KL2 are used for correcting the current inter-edge period $T_i$ for deriving the angular acceleration equivalent value αo to be employed as the period variation index.

FIG. 3 shows results of simulation of the angular acceleration equivalent value αo determined through the procedure described above.

Figure 3A:
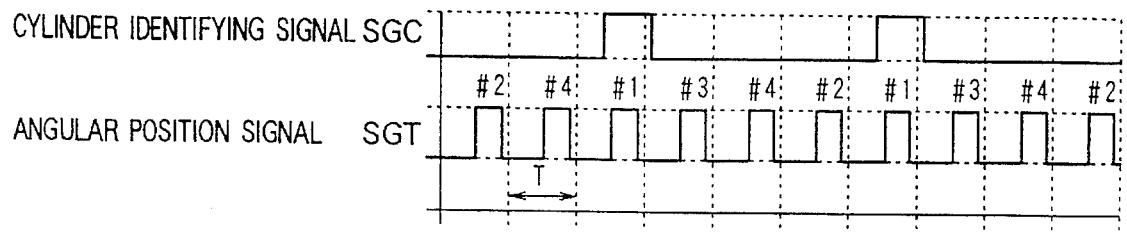
FIGS. 3(a)–(b) are timing charts for illustrating schematically operation of the apparatus in accordance with the procedure shown in FIG. 2.
Figure 3B:
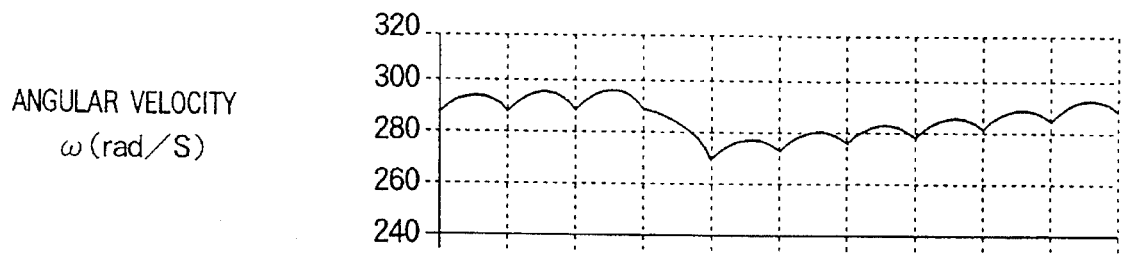
Figure 3C:
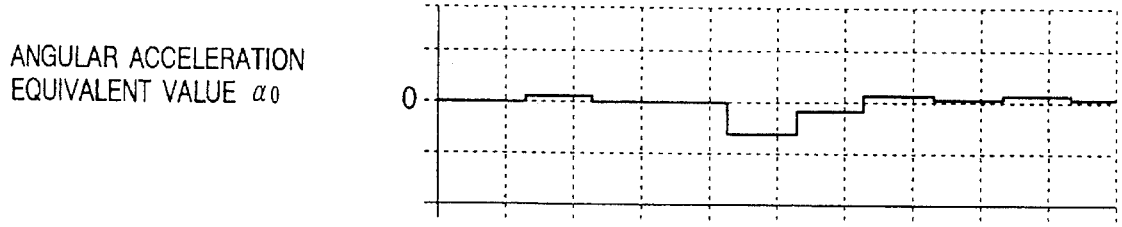

In FIG. 3(a), the cylinder identifying signal SGC is a pulse signal identifying a specific cylinder (e.g. cylinder #1), while the angular position signal SGT is a pulse signal which rises up at every BTDC 75° of each cylinder and falls at every BTDC 5°. Further, ω represents the actual angular speed of the engine 1, as mentioned hereinbefore.

The angular acceleration equivalent value αo is arithmetically determined or calculated in accordance with the expression (1) or (2) on the basis of the period T intervening between the falling edges of the angular position signal SGT by taking into account the correcting coefficients KL1 and KL2. Further, αo' represents the angular acceleration equivalent value determined on the assumption that each of the correcting coefficients KL1 and KL2 is equal to "1" (meaning no correction) in the determination of the angular acceleration equivalent value αo.

Figure 3D:
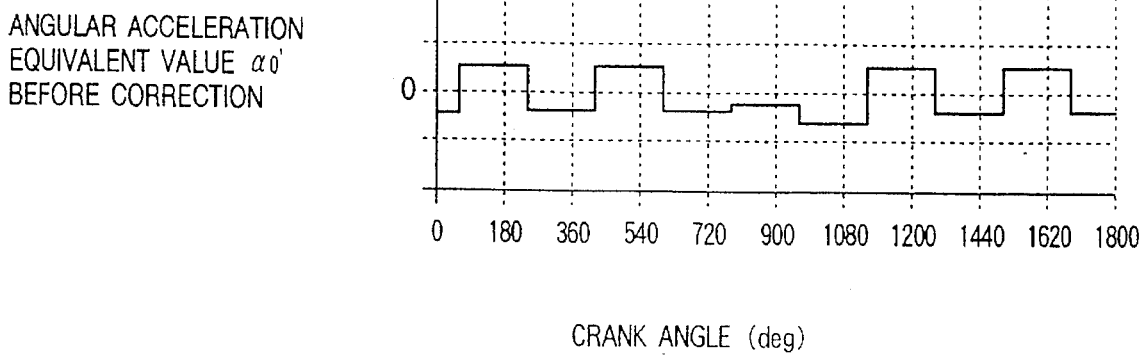

As can be seen from FIG. 3(e), curve representing the angular acceleration equivalent value αo, it is possible to eliminate noise components contained in the uncorrected angular acceleration equivalent value (i.e., angular acceleration equivalent value before correction) αo' of FIG. 3(d) by employing the correcting coefficients KL1 and KL2. Thus, the curve so is smoothed and simplified, which facilitates the succeeding misfire decision processing.

Next, referring to a timing chart of FIG. 4, variation of the correcting coefficients KL1 and KL2 will be explained.

Figure 4A:
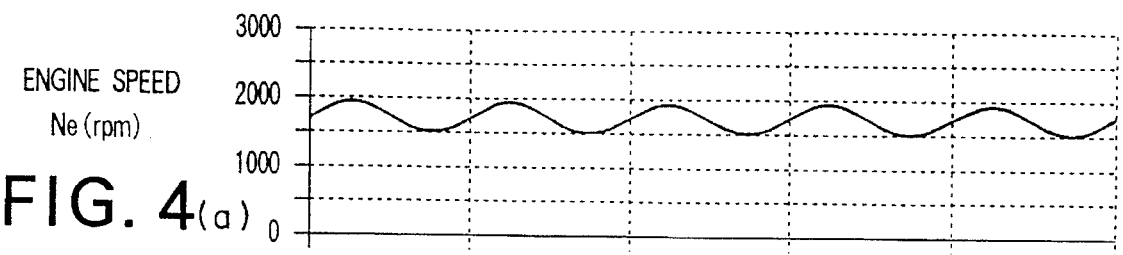
FIGS. 4(a)–4(f) are timing charts for explaining physical meanings of individual correcting coefficients employed in the first embodiment.
Figure 4B:
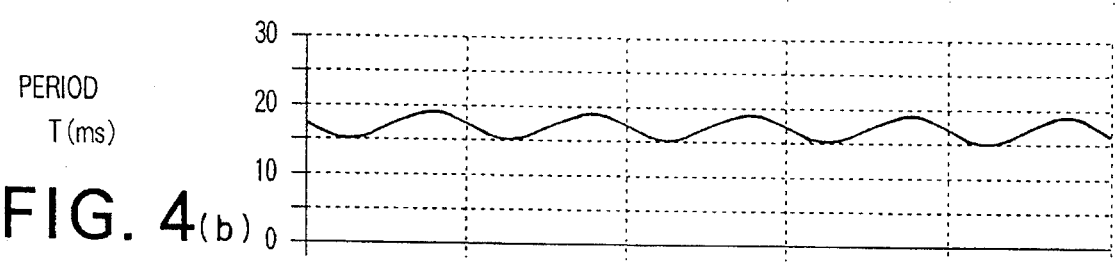
Figure 4C:
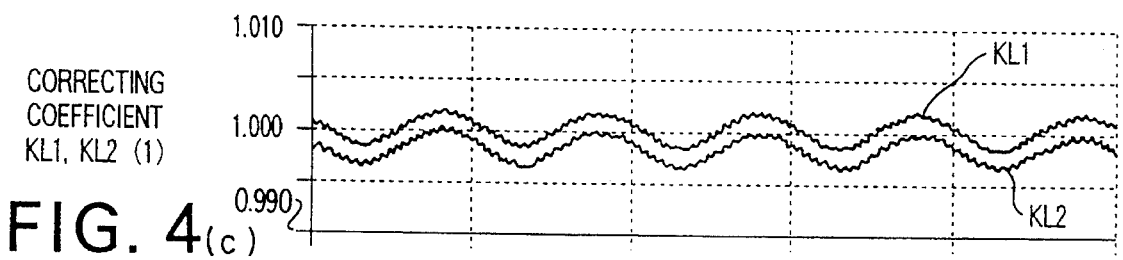
Figure 4D:
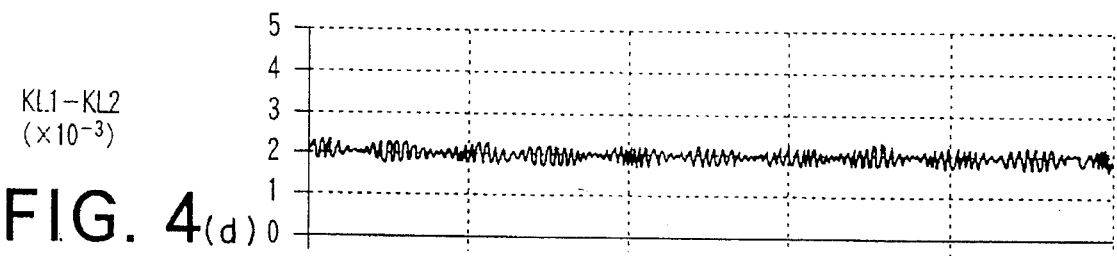
Figure 4E:
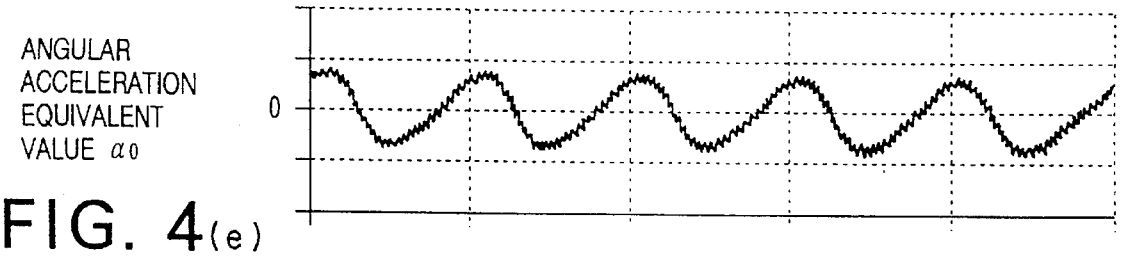
Figure 4F:
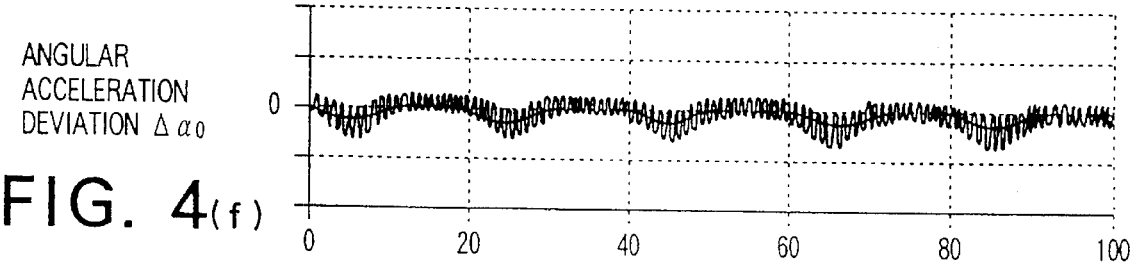
Figure 5A:
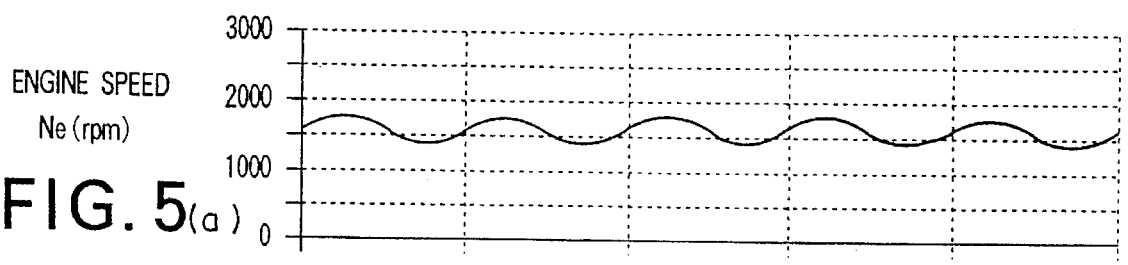
FIGS. 5(a)–5(f) are timing charts for illustrating a problem which may arise when the correcting coefficient updating processing according to the first embodiment is not effected.
Figure 5B:
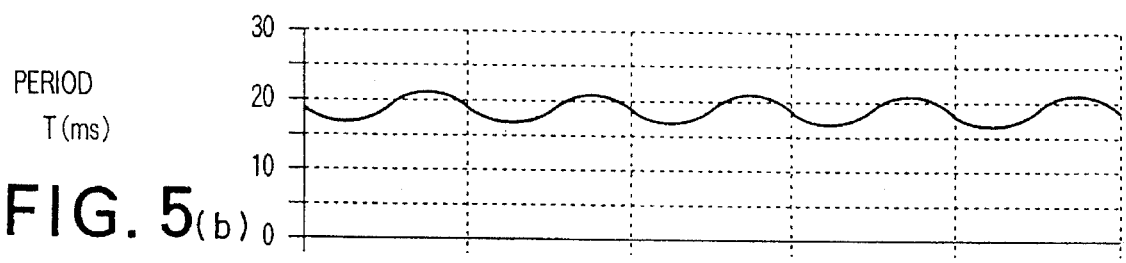
Figure 5C:
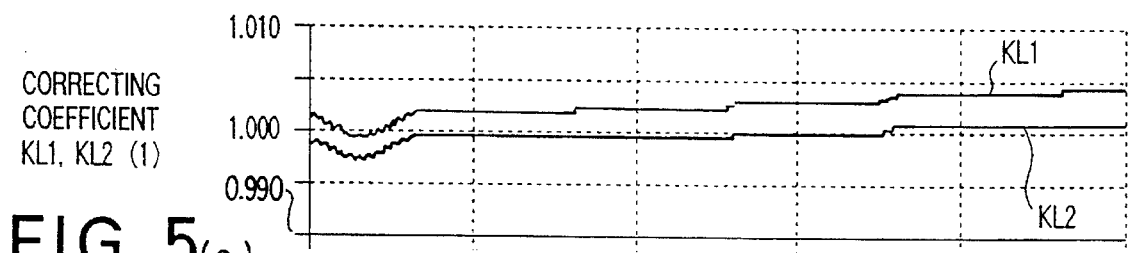
Figure 5D:
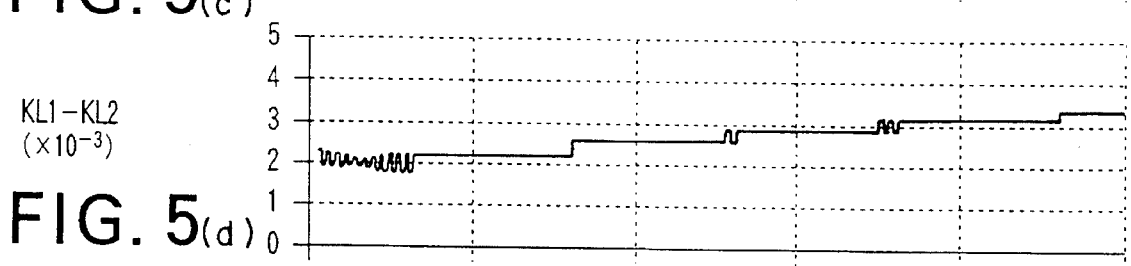
Figure 5E:
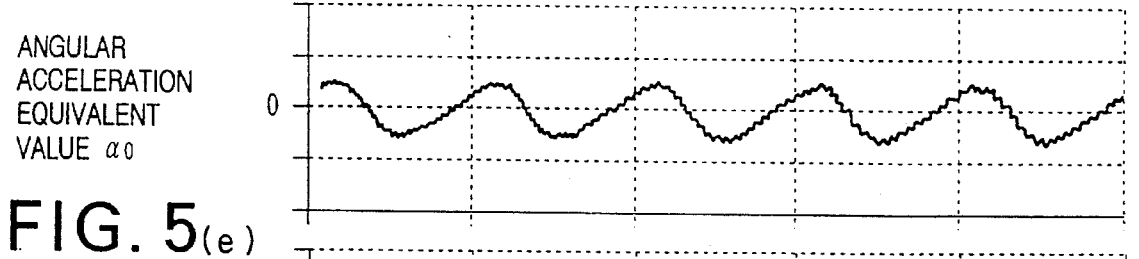
Figure 5F:
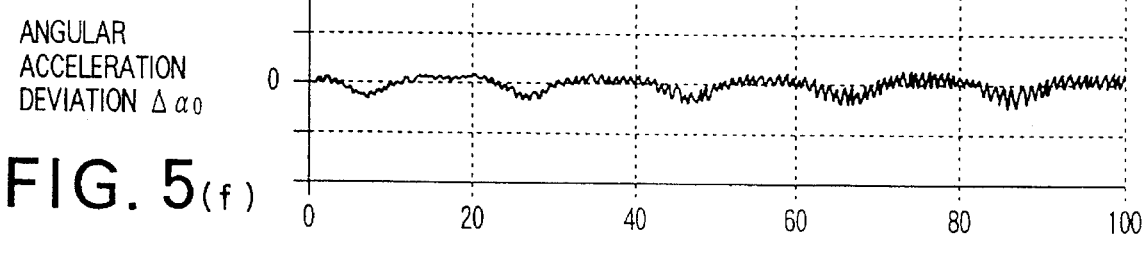

FIG. 4 is a timing chart for illustrating behaviors of individual parameters (e.g. the engine speed Ne, FIG. 4(a) the period T, 4(b) the correcting coefficients KL1 and KL2, FIG. 4(c) the angular acceleration equivalent value αo, 4(c) and the angular acceleration deviation Δαo) FIG. 4(d) when relatively significant variation is taking place in the engine revolution number (rpm) under intermittent engine load.

In FIG. 4, rectangular thin-line curves of the angular acceleration equivalent value αo and the angular acceleration deviation Δαo ($=αo_i - αo_{i-1}$) represent the waveforms obtained when no correction is performed for canceling out the inter-edge angle error ε1, while sinusoidal thick curves represent the waveforms obtained when the inter-edge angle error ε1 has been compensated for.

In this case, because variation in the engine speed is large, the correcting coefficient KL1 and KL2 vary significantly.

Nevertheless, the angular acceleration equivalent value αo and the angular acceleration deviation Δαo are corrected satisfactorily, as indicated by the respective smooth tick-line curves.

Now, description will be directed to a procedure for evaluating rather straightforwardly whether the correcting coefficients KL1 and KL2 are learned correctly.

Starting from the expression (1), the angular acceleration equivalent value αo can be defined as follows:

$$\alpha o = (1/T_i) \times \{(KL1_{i-1}/T_i) - (KL2_{i-1}/T_{i-1})\} = (KL2_{i-1}/T_i) \times \{(KL1_{i-1}/KL2_{i-1}) \times (1/T_i) - (1/T_{i-1})\}$$

In this conjunction, it will be seen that since $KL1 \approx 1.00$, the angular acceleration equivalent value so can be determined in accordance with the following expression (10):

$$\alpha o \approx (1/T_i) \times \{(1 + KL1_{i-1} - KL2_{i-1}) \times (1/T_i) - (1/T_{i-1})\} \quad (10)$$

As can be seen from the above expression (10), even when the values of the correcting coefficients KL1 and KL2 vary in accompanying variation in the rotation speed (rpm) of the engine 1, it may be decided that the correcting coefficients KL1 and KL2 are learned correctly, so long as the value of the term (KL1–KL2) coincides with the expected value which is determined on the assumption that the learning or routine is executed normally.

Parenthetically, the expected value of the difference (KL1–KL2) mentioned above can be determined in accordance with the following expression:

$$KL1 - KL2 \approx 2 \times (T_{KL1} - T_{KL2})/(T_{KL1} + T_{KL2})$$

In the above expression (11), the terms $T_{KL1}$ and $T_{KL2}$ represent the values of the periods T corresponding to the correcting coefficients KL1 and KL2, respectively, when no variation takes place in the engine speed.

Graphical data shown in FIG. 4 are depicted on the assumption that the expected value of (KL1–KL2) as determined in accordance with the expression (11) is $2 \times 10^{-3}$ (=0.002). Because (KL1–KL2) varies around the center value of 0.002, it can be determined that the learning has been conducted as expected.

As will now be appreciated from the foregoing description, the error contained in the period T which is primarily ascribable to the inter-edge angle error ε1 is corrected by using the correcting coefficients KL1 and KL2. Thus, the period variation evaluating index, e.g. the angular acceleration equivalent value so can be determined for all the engine cylinders, whereby subsequent processing involved in the misfire decision can be simplified significantly.

Next, referring to FIGS. 5 to 7, description will be made in detail of operation of the misfire detecting apparatus according to the instant embodiment of the invention on the assumption that the learning is intermittently effectuated in dependence on variation or change in the engine operation state D.

In general, it is required that the learning of the correcting coefficients KL1 and KL2 has to be effected on the condition that the combustion within the engine cylinders is stable. Accordingly, when it is decided that the combustion is not stable as in the case of the engine operation at a low speed under a light load, the learning is inhibited (see FIG. 2, step S201).

FIG. 5 is a timing chart for illustrating a problem which may arise when the numbers of times for updating the correcting coefficients KL1 and KL2, respectively, differ from each other. As can be seen from FIG. 5, the learning is inhibited during a period in which the engine speed is lower than 1500 rpm inclusive thereof and during a predetermined succeeding period. Stated in another way, the learning/updating routine is performed intermittently rather than continuously.

In that case, unless appropriate measures are applied, there may arise such situation in which only the correcting coefficient KL1 is updated with the other correcting coefficient KL2 being left not updated. At that time, the parameter value (KL1–KL2) indicating the degree of learning of the correcting coefficients KL1 and KL2 suffers from accumulation of error, as can be seen from FIG. 5, as a result of which the value of (KL1–KL2) will deviate remarkably from the normal learning index value of "0.002". As a consequence, significant noise makes appearance in the angular acceleration deviation Δαo with the angular acceleration equivalent value so being equally affected by the error. Thus, if the misfire decision processing is executed on the basis of the angular acceleration equivalent value αo and the angular acceleration deviation value Δαo both containing large noise components (see FIG. 2, steps S106, S107 and S108), accuracy or reliability of the misfire decision will be degraded particularly in the engine operation state in which the signal indicating misfire occurrence is small. In the worst case, even the normal firing may be decided as the misfiring.

For coping with the problem mentioned above, it is taught by the invention incarnated in the embodiment now under consideration that the updating arithmetic means is incorporated in the correcting coefficient arithmetic means 7 in order that the numbers of times for updating the correcting coefficients KL1 and KL2, respectively, are made equal to each other.

Figure 6:
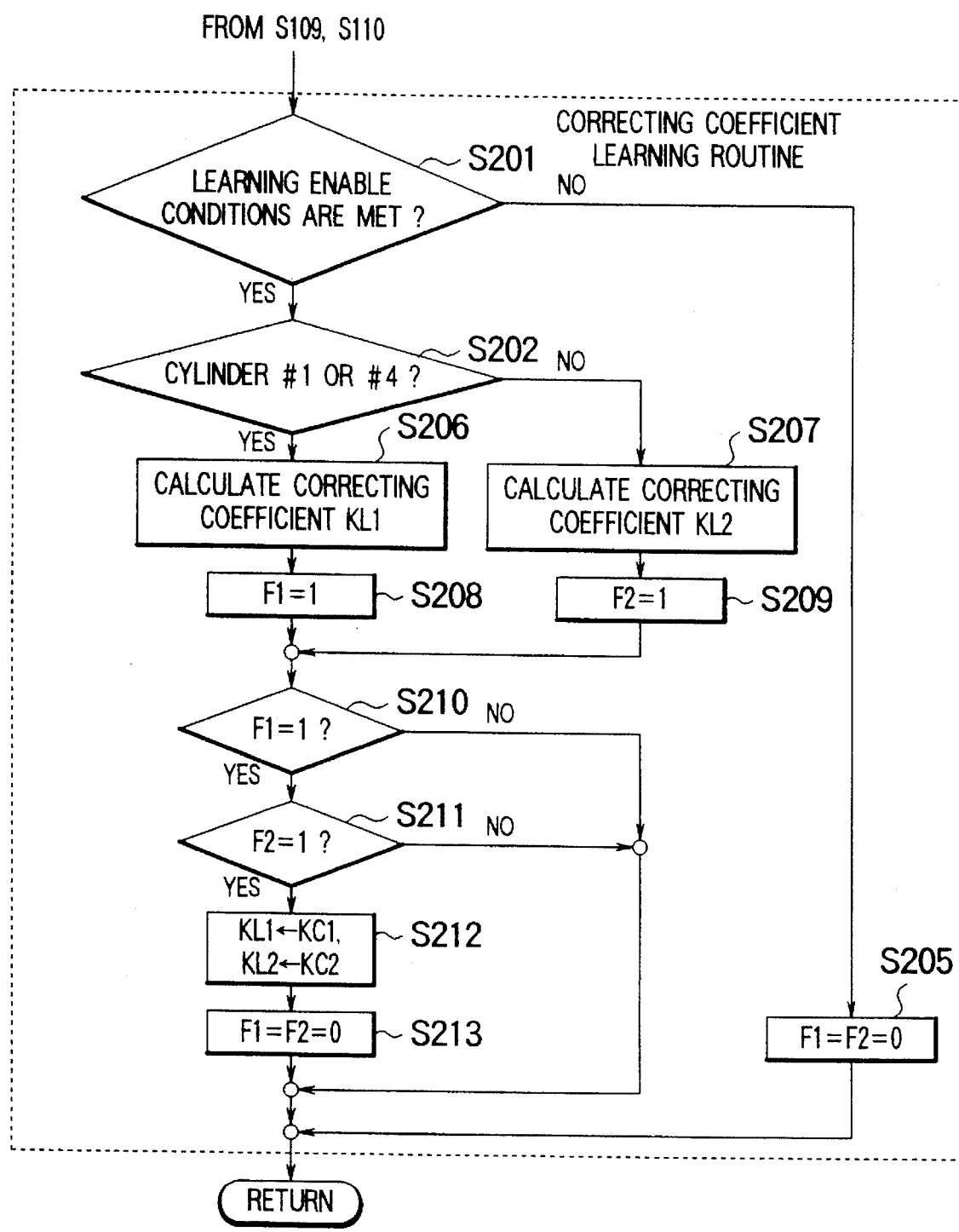
FIG. 6 is a flow chart for illustrating a correcting coefficient learning process according to the first embodiment of the invention.

Now, referring to a flow chart of FIG. 6, description will be directed to a processing for preventing the erroneous learning according to the instant embodiment of the invention.

FIG. 6 shows a correcting coefficient learning logic or routine to be executed in succession to the step S109 or S110 (see FIG. 2). In this figure, steps S201 and S202 are same as those mentioned hereinbefore. Further, steps S205 to S213 shown in FIG. 6 correspond to the steps S203 and S204 shown in FIG. 2.

In the calculation/learning processing for determining the correcting coefficients KL1 and KL2, the correcting coefficients KL1 and KL2 are corrected in the steps S206 and S207 in the manner described hereinbefore. Let's represent the results of this arithmetic operation by KC1 and KC2, respectively. In this conjunction, it should also be mentioned that these quantities KC1 and KC2 are not straightforwardly reflected to the correcting coefficients KL1 and KL2 but used for updating the correcting coefficients KL1 and KL2 in the step S212 after confirmation that arithmetic determinations for both the correcting coefficients KL1 and KL2, respectively, have been completed once by checking the flags F1 and F2 in the steps S208 and S209.

At first, in the step S201, it is decided whether or not the learning conditions are not met. If so (i.e., the answer of the step S201 is negative "NO"), the flags F1 and F2 are reset to "0" in the step S295, whereupon return is made to the start. The flags F1 and F2 of "0" indicate that no learning procedure is executed yet.

On the other hand, when it is decided in the step S201 that the conditions for learning are satisfied (i.e., when the step S201 results in "YES"), then identification of the cylinders is made to thereby determine which of the correcting coefficients KL1 or KL2 is to be corrected at this time point (see step S202). In dependence on the result of this determination, the previously mentioned quantity KC1 or KC2 is arithmetically determined.

More specifically, when the first or fourth cylinder #1 or #4 is identified in the step S202, the quantity KC1 for updating the correcting coefficient KL1 is determined in accordance with:

$$KC1=Ks\times KL1_{i-1}+(1-Ks)KR_i \qquad (12)$$

On the other hand, when the second or third cylinder #2 or #3 is identified in the step S202 (i.e., when the answer of this step S202 is "NO"), the quantity KC2 for updating the correcting coefficient KL2 is determined in accordance with:

$$KC2=Ks\times KL2_{i-1}+(1-Ks)\times KR_i \qquad (13)$$

Subsequently, in the step S208 or S209, the flag F1 or F2 is set to "1", indicating that the quantities KC1 or KC2 has been determined.

In the step S210 and S211, it is decided whether or not the flags F1 and F2 are set to "1". Only when it is decided that both of the flags F1 and F2 are "1" (i.e., only when the decision steps S210 and S211 result in affirmation "YES"), the processing proceeds to the step S212. At this time point, it is decided that the quantities KC1 and KC2, respectively, have been determined once as of the preceding updating time point (or as of the clearing of the learning inhibit conditions).

In the step S212, the values of the correcting coefficients KL1 and KL2 are replaced by the values of the quantities KC1 and KC2, respectively. In this way, the correcting coefficients KL1 and KL2 are simultaneously updated through the learning procedure.

Finally, in the step S213, the flags F1 and F2 are reset to "0" for allowing simultaneous updating of all the correcting coefficients KL1 and KL2 to be executed in the succeeding processing, whereupon the routine returns to the start.

On the other hand, when it is decided that the flag is "0" in either the step S210 or S211, this means that there remains the cylinders for which the quantities KC1 or KC2 has not yet been determined. Accordingly, in this case, neither the step S212 for updating the correcting coefficients KL1 and KL2 nor the flag resetting step S213 are executed.

The effects achieved through the processing illustrated in FIG. 6 will be described by referring to a timing chart of FIG. 7.

FIG. 7 shows behaviors of individual parameters after updating of the correcting coefficients KL1 and KL2 through the routine illustrated in FIG. 6 in the engine operation state similar to that described hereinbefore in conjunction with FIG. 5.

In the case of the characteristic diagrams shown in FIG. 7, both the correcting coefficients KL1 and KL2 are simultaneously updated in contrast to the case illustrated in FIG. 5, while updating of both the correcting coefficients KL1 and KL2 is inhibited when the learning enable conditions becomes unsatisfied before the quantities KC1 and KC2 are determined.

Thus, one-sided updating of the KCL1 or KCL2 can be avoided, whereby the period variation evaluation indexes (the angular acceleration equivalent value αo and the angular acceleration deviation Δαo) which suffer least noise is made available for effecting the misfire decision, which can thus be made with enhanced reliability.

Because the values corresponding to the angular intervals of the angular position signal SGT based on a plurality of segment reference positions of the sensing blade assembly 2 are set as the correcting coefficients KL1 and KL2, respectively, there can be obtained highly reliable correcting coefficients which are based on the accurate crank angles.

Besides, because the correcting coefficients are determined on the basis of the standardized values of the period ratio with reference to the period corresponding to one complete revolution of the crank shaft of the engine, as can be seen from the expressions (7) to (9) mentioned hereinbefore, there are made available the correcting coefficients which can ensure high accuracy and reliability for the misfire occurrence decision.

Embodiment 2

In the misfire detecting apparatus according to the first embodiment of the invention, the two correcting coefficients KL1 and KL2 for the angular intervals of the signal outputted from the crank angle sensor 3, respectively, are determined as the ratios relative to the period corresponding to one complete rotation of the crank shaft 14. By contrast, according to the invention incarnated in the second embodiment, it is taught to determine the correcting coefficients KL1 and KL2 on the basis of the ratio between the periods corresponding to those cylinders for which the ignition timings succeed to each other. By way of example, the correcting coefficients KL1 and KL2 may be defined on the basis of the ratio $T_i/T_{i-1}$, and then the angular acceleration equivalent value αo may be determined as the period variation index in accordance with:

$$\alpha o=(\tfrac{1}{2}T_i)(KL1/T_i-KL2/T_{i-1})$$

Embodiment 3

According to a third embodiment of the invention, the correcting coefficients KL1 and KL2 can be determined on the basis of the ratio of the periods corresponding to the respective cylinders to the period taken for two complete rotations of the crank shaft. In this case, the previously mentioned expression (9) is rewritten as follows:

$$KR_i=4\times T_i/(T_i+T_{i-1}+T_{i-2}+T_{i-3})$$

In the above expression, the period ratio $KR_i$ is a value obtained by standardizing the above-mentioned period ratio, i.e., by dividing the current period $T_i$ by a mean value of the current period $T_i$ and the preceding periods $T_{i-1}$, $T_{i-2}$ and $T_{i-3}$.

It goes without saying that the effects similar to those of the first embodiment can be obtained equally in the case of the second and third embodiments by using the period variation index determining expressions compatible with the definition of the correcting coefficients such as the expressions (1) and (2).

Embodiment 4

In the case of the first embodiment of the invention, the so-called one-sided learning/updating of the correcting coefficient is prevented by updating simultaneously a plurality of correcting coefficients KL1 and KL2. However, in the case where the updating conditions are satisfied only intermittently for each of the correcting coefficients, they can be updated on a one-by-one basis.

By way of example, in association with the angular interval (embodiment 1), the updating may be started from the correcting coefficient KL1 corresponding to the predetermined angular interval of the sensing blade assembly 2, and the updating of the correcting coefficient after the last updating of the correcting coefficient KL2 corresponding to the second predetermined angular interval may be invalidated. In this case, the first and second angular intervals of the sensing blade assembly 2 are so determined that the first angular interval during one rotation of the crank shaft of the engine 1 is defined as the first angular interval with the second interval being then defined as the last interval in the sense mentioned above.

Further, in association with the cylinders (embodiments 2 and 3), the updating of the correcting coefficients which follows the last updating of the correcting coefficients for a given cylinder determined in dependence on the cylinder for which the updating of the correcting coefficient is started may be invalidated.

In this manner, even in the case where the correcting coefficient updating conditions are intermittently satisfied for the correcting coefficients (the number of which corresponds to that of the cylinders), the one-sided learning/updating of any one of the correcting coefficients can be avoided.

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, in the description of the preferred embodiments, two correcting coefficients KL1 and KL2 are employed. However, the invention is never restricted thereto but any given number of such correcting coefficients may be employed. Further, although the invention has been described in conjunction with four-cylinder engine, it should be understood that the invention can equally be applied to other internal combustion engines.

Accordingly, all suitable modifications and equivalents may be resorted to, falling within the spirit and scope of the invention.

What is claimed is:

1. A misfire detecting apparatus for an internal combustion engine, comprising:

a) reference angular position setting means (2) mounted on a crank shaft (14) of said internal combustion engine and including a plurality of segments (12,13) individually defining angular intervals corresponding to reference positions for a plurality of cylinders of said engine, respectively;

b) a crank angle sensor (3) disposed in opposition to said reference angular position setting means for generating a plurality of pulse signals as an angular position signal (SGT) for every predetermined crank angle per one rotation of said crank shaft;

c) period measuring means (6) for measuring periods (T) of said plurality of pulse signals, respectively;

d) correcting coefficient arithmetic means (7) for arithmetically determining a plurality of correcting coefficients (KL1,KL2) individually corresponding to the plurality of segments on the basis of said plurality of periods in a steady operation state of said internal combustion engine;

e) period variation index arithmetic means (8) for arithmetically determining an index ($\alpha o$) which quantifies variations of said periods on the basis of said correcting coefficients and said periods; and f) misfire decision means (9) for making a decision as to an occurrence of misfire in said internal combustion engine on the basis of said period variation index;

g) wherein said correcting coefficient arithmetic means includes updating arithmetic means for updating said plurality of correcting coefficients to respective latest values by learning; and h) wherein said updating arithmetic means updates said plurality of correcting coefficients such that a number of times for updating said correcting coefficients is substantially the same for each one of said plurality of correcting coefficients, respectively.

2. A misfire detecting apparatus for an internal combustion engine according to claim 1, wherein said plurality of correcting coefficients correspond to said angular intervals of said segments, respectively, of said reference angular position setting means.

3. A misfire detecting apparatus for an internal combustion engine according to claim 2, wherein when conditions for allowing said correcting coefficients to be updated are satisfied only intermittently, updating of the correcting coefficients which follows a last updating of the correcting coefficient corresponding to the angular interval for the cylinder from which the updating of the correcting coefficients has been started is invalidated.

4. A misfire detecting apparatus for an internal combustion engine according to claim 2, wherein said plurality of correcting coefficients are arithmetically determined on the basis of the ratios between a period corresponding to said one rotation of said crank shaft and periods corresponding to said angular intervals, respectively.

5. A misfire detecting apparatus for an internal combustion engine according to claim 4, wherein when conditions for allowing said correcting coefficients to be updated are satisfied only intermittently, updating of the correcting coefficients which last updating of the correcting coefficient corresponding to the angular interval for the cylinder from which the updating of the correcting coefficients has been started is invalidated.

6. A misfire detecting apparatus for an internal combustion engine according to claim 4, wherein when conditions for allowing said correcting coefficients to be updated are satisfied only intermittently, updating of the correcting coefficients which follows a last updating of the correcting coefficient corresponding to the cylinder from which the updating of the correcting coefficients has been started, is invalidated.

7. A misfire detecting apparatus for an internal combustion engine according to claim 1, wherein said plurality of correcting coefficients are determined in correspondence to cylinders of said engine, respectively.

8. A misfire detecting apparatus for an internal combustion engine according to claim 7, wherein said plurality of correcting coefficients are arithmetically determined on the basis of the ratios between a period corresponding to two rotations of said crank shaft and periods corresponding to said angular intervals, respectively.

9. A misfire detecting apparatus for an internal combustion engine according to claim 7, wherein when conditions for allowing said correcting coefficients to be updated are satisfied only intermittently, updating of the correcting coefficients which follows a last updating of the correcting coefficient corresponding to the cylinder from which the updating of the correcting coefficients has been started, is invalidated.

10. A misfire detecting apparatus for an internal combustion engine according to claim 1, wherein said updating arithmetic means updates simultaneously said plurality of correcting coefficients.

* * * * *